G. W. Nichols,
Skid.
N° 60,926. Patented Jan. 1, 1867.
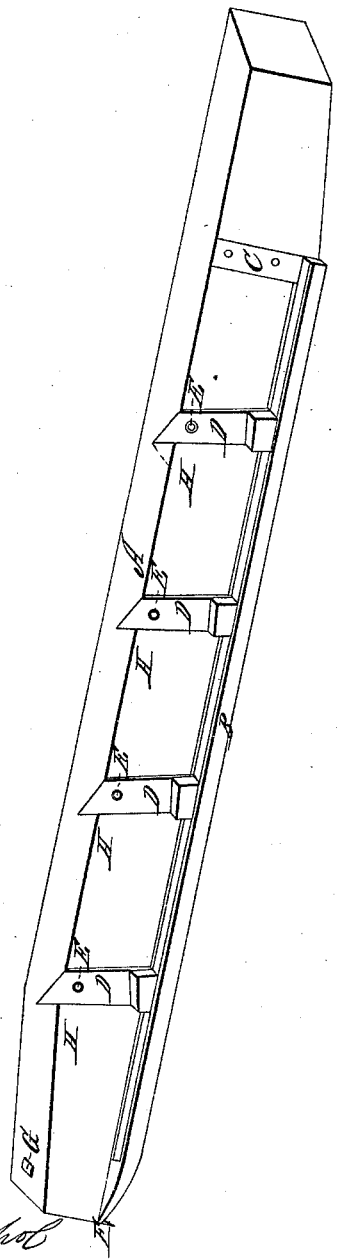
Witnesses:
Wm H Nichol
Wm M Newcomb
Inventor:
Geo W Nichols

United States Patent Office.

GEORGE W. NICHOLS, OF RIVER FALLS, WISCONSIN.

Letters Patent No. 60,926, dated January 1, 1867.

IMPROVED LOGGING SKID.

*The Schedule referred to in these Letters Patent and making part of the same.*

TO ALL WHOM IT MAY CONCERN:

Be it known that I, GEORGE W. NICHOLS, of River Falls, in the county of Pierce, in the State of Wisconsin, have invented a new and useful Self-Propping Logging Skid; and I do hereby declare that the following is a full and exact description thereof.

The nature of my invention consists in pivoting or bolting loosely to a timber of any desired length or size short upright props with angular tops projecting above the upper surface of the skid, and so arranged that they will easily bend forward by the pressure of the log as it rolls against them, so that the angular edge will be flush with the upper surface of the skid; and as it passes over so as to clear the points, the lower ends being the heaviest, they turn back to their upright position, the lower ends resting upon a ledge formed on the side of the skid for the purpose of propping the log firmly in its position. A spur projecting downwards from the forward end prevents the skid from slipping, or it may be driven into the log, so that the skid need not be raised entirely above the log.

To enable others skilled in the art to make and use my invention, I will proceed to describe its construction and operation more clearly, reference being had to the accompanying drawings, and to the letters of reference marked thereon.

I construct my skid of a square timber, A, having a ledge, B, projecting from its side near the lower edge, and supported by a metallic knee, C. D D, &c., are props with angular tops and heavy bottoms resting upon the ledge B and bolted to the skid A, as at E. F is a metallic plate fastened rigidly to the lower surface of the skid, having a spur projecting downwards and flush with the forward end. G is a bolt resting upon the plate F, with a large flat head on the upper surface of the skid to strike upon to drive the spur into a log when necessary. H is a pin to prevent props from going too far down. As the log rolls forward it presses the angular top of the props down, as shown by the dotted line, and passes over it, when it again rises to its place and holds the log from rolling back.

What I claim as my invention, and wish to secure by Letters Patent, is—

The application to a skid of the props D D, in combination with the ledge B, or its equivalent, the plate F, with its spur, and bolt G, constructed substantially as and for the purposes specified.

GEO. W. NICHOLS.

Witnesses:
WM. M. NEWCOMB,
WM. H. NICHOLS.